United States Patent
Liu et al.

(10) Patent No.: US 8,789,031 B2
(45) Date of Patent: Jul. 22, 2014

(54) SOFTWARE CONSTRUCTED STRANDS FOR EXECUTION ON A MULTI-CORE ARCHITECTURE

(75) Inventors: Wei Liu, San Jose, CA (US); Lixin Su, Madison, WI (US); Youfeng Wu, Palo Alto, CA (US); Herbert Hum, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1512 days.

(21) Appl. No.: 11/901,644

(22) Filed: Sep. 18, 2007

(65) Prior Publication Data

US 2009/0077360 A1  Mar. 19, 2009

(51) Int. Cl.
*G06F 9/45* (2006.01)

(52) U.S. Cl.
USPC ............................ 717/154; 717/149; 717/151

(58) Field of Classification Search
None
See application file for complete search history.

(56) References Cited

U.S. PATENT DOCUMENTS

| | | | |
|---|---|---|---|
| 5,202,975 A * | 4/1993 | Rasbold et al. | 717/151 |
| 5,488,727 A * | 1/1996 | Agrawal et al. | 717/154 |
| 5,493,675 A * | 2/1996 | Faiman et al. | 717/151 |
| 5,613,117 A * | 3/1997 | Davidson et al. | 717/144 |
| 5,659,753 A * | 8/1997 | Murphy et al. | 717/147 |
| 5,696,973 A * | 12/1997 | Agrawal et al. | 717/154 |
| 5,768,594 A * | 6/1998 | Blelloch et al. | 717/149 |
| 5,768,596 A * | 6/1998 | Chow et al. | 717/154 |
| 6,026,222 A * | 2/2000 | Gupta et al. | 716/103 |
| 6,292,938 B1 * | 9/2001 | Sarkar et al. | 717/138 |
| 6,320,848 B1 * | 11/2001 | Edwards et al. | 370/255 |
| 6,397,379 B1 * | 5/2002 | Yates et al. | 717/140 |
| 6,918,111 B1 * | 7/2005 | Damron et al. | 717/161 |
| 6,964,043 B2 * | 11/2005 | Wu et al. | 717/159 |
| 7,325,232 B2 * | 1/2008 | Liem | 718/102 |
| 7,562,355 B2 * | 7/2009 | Gu et al. | 717/151 |
| 7,603,546 B2 * | 10/2009 | Narayanasamy et al. | 713/1 |
| 7,685,587 B2 * | 3/2010 | Pozzi et al. | 717/151 |
| 8,453,131 B2 * | 5/2013 | Li et al. | 717/149 |

(Continued)

OTHER PUBLICATIONS

Harry Porter, "DAG-BAsed Optimization of IR Code in a Basic Block", University of Portland, 2006, <http://web.cecs.pdx.edu/~harry/compilers/slides/Optimize2.pdf>, pp. 1-21.*

(Continued)

*Primary Examiner* — Thuy Dao
*Assistant Examiner* — Samuel Hayim
(74) *Attorney, Agent, or Firm* — Trop, Pruner & Hu, P.C.

(57) ABSTRACT

In one embodiment, the present invention includes a software-controlled method of forming instruction strands. The software may include instructions to obtain code of a superblock including a plurality of basic blocks, build a dependency directed acyclic graph (DAG) for the code, sort nodes coupled by edges of the dependency DAG into a topological order, form strands from the nodes based on hardware constraints, rule constraints, and scheduling constraints, and generate executable code for the strands and store the executable code in a storage. Other embodiments are described and claimed.

9 Claims, 4 Drawing Sheets

(56) References Cited

U.S. PATENT DOCUMENTS

| | | | |
|---|---|---|---|
| 2002/0124012 A1* | 9/2002 | Liem et al. | 707/200 |
| 2003/0101442 A1* | 5/2003 | Wu | 717/156 |
| 2003/0101444 A1* | 5/2003 | Wu et al. | 717/161 |
| 2004/0078790 A1 | 4/2004 | Wu et al. | 717/154 |
| 2004/0249781 A1* | 12/2004 | Anderson | 707/1 |
| 2006/0070047 A1* | 3/2006 | Narayanasamy et al. | 717/144 |
| 2007/0011668 A1* | 1/2007 | Wholey et al. | 717/151 |
| 2007/0011684 A1* | 1/2007 | Du et al. | 718/105 |
| 2007/0038987 A1* | 2/2007 | Ohara et al. | 717/151 |
| 2007/0044084 A1* | 2/2007 | Wang et al. | 717/151 |
| 2007/0094646 A1* | 4/2007 | Higham | 717/136 |
| 2007/0162902 A1* | 7/2007 | Pozzi et al. | 717/154 |
| 2007/0174750 A1 | 7/2007 | Borin | 714/732 |
| 2007/0294680 A1* | 12/2007 | Papakipos et al. | 717/149 |
| 2007/0294696 A1* | 12/2007 | Papakipos et al. | 718/102 |
| 2009/0049433 A1* | 2/2009 | Li et al. | 717/149 |

OTHER PUBLICATIONS

Robert Kramer et al., "The Combining DAG: A Technique for Parallel Data Flow Analysis", IEEE, 1994, <http://ieeexplore.ieee.org/stamp/stamp.jsp?tp=&arnumber=298205>, pp. 1-9.*

Luc Maranget, "Compiling Pattern Matching to Good Decision Trees", ACM, 2008, <http://delivery.acm.org/10.1145/1420000/1411311/p35-maranget.pdf>, pp. 1-12.*

U.S. Appl. No. 11/537,585, filed Sep. 29, 2006, entitled "Methods and Apparatus to Optimize the Parallel Execution of Software Processes," by So, et al.

Nathan Clark, et al., "Processor Acceleration Through Automated Instruction Set Customization," 2003, pp. 1-12.

Anne Bracy, et al., "Dataflow Mini-Graphs: Amplifying Superscalar Capacity and Bandwidth," Dec. 2004, pp. 1-12.

Ho-Seop Kim, et al., "An Instruction Set and Microarchitecture for Instruction Level Distributed Processing," 2002, pp. 1-11.

* cited by examiner

SOFTWARE CONSTRUCTED STRANDS FOR EXECUTION ON A MULTI-CORE ARCHITECTURE

BACKGROUND

In superscalar processors, area and power cost are major constraints for an architecture design. Especially in the context of multi-core processors, a power efficient and high performance core design is of utmost concern.

While various manners of designing processors to operate with reduced power are known, extensive efforts are required to design and develop such processors. Accordingly, efforts are also made to improve software for execution on such multi-core or many-core processors. Some approaches alter code into a strand-based format, in which strands including strings of instructions are generated. However, such efforts are typically limited and do not improve power efficiency.

DETAILED DESCRIPTION

Embodiments may provide a software-hardware co-design approach using software-constructed strands to significantly reduce hardware complexity and power consumption. A strand, which consists of a string of instructions, is represented as a single instance in hardware, and therefore, it can effectively reduce the hardware complexity and resource requirements while delivering same or even better performance. Compared to a hardware approach, software-constructed strands have no hardware overheads and form strands from a much larger scope (e.g. superblock or trace). Moreover, embodiments provide more opportunities for enabling both compiler and architecture optimizations, such as node splitting. Software strand formation can be done either statically in a compiler, which incurs no runtime overhead, or dynamically in a dynamic optimizer, which can match strands to microarchitecture closely. For an out-of-order core, adding strand support can reduce power consumption without impacting performance.

In various embodiments, software-constructed strands may be generated and executed to improve performance and power consumption of a many-core processor. To effect such improvements, embodiments may generate code optimized for a given architecture based on superblocks of code, which are groups of so-called basic blocks, each including a group of instructions themselves, and only have a single entry point. To enable such performance gains, embodiments may generate software-constructed strands from superblocks according to particular hardware constraints of a given system. In addition to such hardware constraints, additional rule-based constraints such as generating strands having a predetermined maximum number of input values and output values, a maximum number of instructions per strand, a maximum number of memory operations per strand, a maximum number of branch operations per strand, and whether the branch operation is allowed be to the last instruction in the strand, may be similarly used to generate software-constructed strands.

In various embodiments, a compiler, which may be a static or dynamic compiler, may be used to generate strands from the original superblocks based on these constraints. The compiler may then compile strands into code and may further perform optimizations on the strands. Such optimizations further improve performance and reduce power consumption by combining multiple smaller strands into a larger strand. After optimizing the strands into a group of optimized strands, the code may be stored, e.g., in a code cache or other location and then during program execution, the strands of code may be executed on multiple cores to realize the desired functionality with reduced power consumption.

Figure 1:
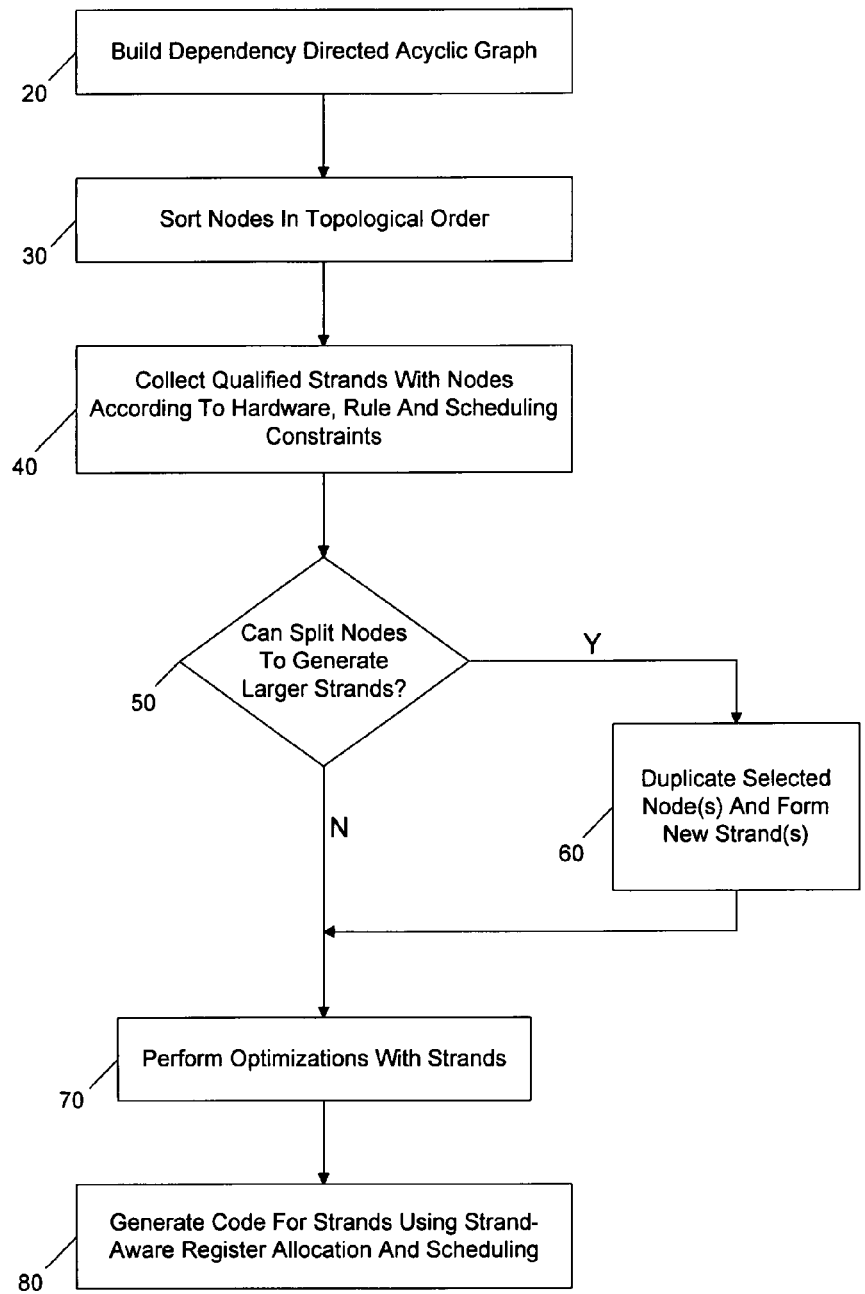
FIG. 1 is a flow diagram of a method in accordance with one embodiment of the present invention.

Referring now to FIG. 1, shown is a flow diagram of a method in accordance with one embodiment of the present invention. As shown in FIG. 1, method 10 may be used to generate software-constructed strands in accordance with an embodiment of the present invention. As shown in FIG. 1, method 10, which may be performed by a compiler, such as a static compiler, or a dynamic optimizer to dynamically generate strands matched closely to design constraints of a microarchitecture.

As shown in FIG. 1, method 10 may begin by building a dependency directed acyclic graph (DAG) (block 20). For example, for each superblock of code, a dependency DAG may be built. Then the nodes of the DAG may be sorted in topological order (block 30). After such sorting, qualified strands may be collected with nodes according to predetermined rules and constraints (block 40). For example, various hardware constraints associated with a given architecture, as well as scheduling and other rule-based constraints may be taken into consideration in collecting nodes into strands. As described above, examples of rule-based constraints may include maximum numbers of inputs and outputs per strand and so forth. Scheduling constraints may relate to dependencies between instructions which could cause scheduling deadlocks. Hardware constraints may be associated with a given processor and may relate to various issues such as latencies for certain operations, instruction size, data width and so forth.

Referring still to FIG. 1, after collecting qualified strands, it may be determined whether any of the nodes within given strands can be split to generate larger strands (diamond 50). For example, strands which may be of a smaller size, e.g., one or several nodes, may not be larger because of violation of a given constraint, e.g., exceeding the number of inputs, outputs or so forth. If such strands exist, selected nodes may be duplicated. More specifically, nodes that generate results for multiple consumers may be duplicated and new strands may be formed using these duplicated nodes (block 60). From both of diamond 50 and block 60, control passes to block 70, where various optimizations may be performed with regard to the strands. For example, speculative optimizations may be performed, as will be described further below. Then, code for the strands may be generated using strand-aware register allocation and scheduling techniques (block 80). For example, as will be described further below a so-called strand instruction may be inserted into an instruction stream to identify the strands associated with a certain number of following instructions of the instruction stream. While not shown in FIG. 1, after such code generation, the code may be stored in a given storage location, e.g., a code cache or other storage. The code may then be executed, e.g., on a multi-core or many-core processor. While shown with this particular implementation in the embodiment of FIG. 1, the scope of the present invention is not limited in this regard.

Table 1 shows pseudocode of an algorithm of forming strands in accordance with one embodiment of the present invention. The algorithm forms strands on each superblock, which is represented as a dependency directed acyclic graph (DAG). Each node in the DAG represents an instruction and each edge between nodes represents the dependence between instructions. The search algorithm puts all nodes into a work list according to the topological order. Then it starts to search for a qualified strand based on the constraints, i.e., the number of instructions, the number of inputs, the number of outputs, the number of memory operations, the number of branches, and others.

TABLE 1

```
for each superblock in program {
    build dependency DAG;
    sort all nodes in topological order;
    initialize solution_list = {φ}
    push tuples for sink nodes in topological order (node, strand set
        {φ}) into worklist;
    while (!empty(worklist)) {
        pop (node, strand set) from the worklist;
        collect all qualified (subject to the constraints and not cause
        scheduling
            deadlock) strands starting with node;
        for each qualified strand qs {
            get next available node avail_node which is not included in strand
                set and this qs and with the least topological number;
            if ( avail_node exists ) {
                for each avail_node
                    push (avail_node, strand set ∪ {qs}) into worklist;
            } else {
                Add strand set ∪ {qs} into solution_list;
            }
        }
        prune worklist based on coverage and average strand size;
    }
    return the best solution which has best coverage and greatest average
    strand size;
}
```

Figure 2:
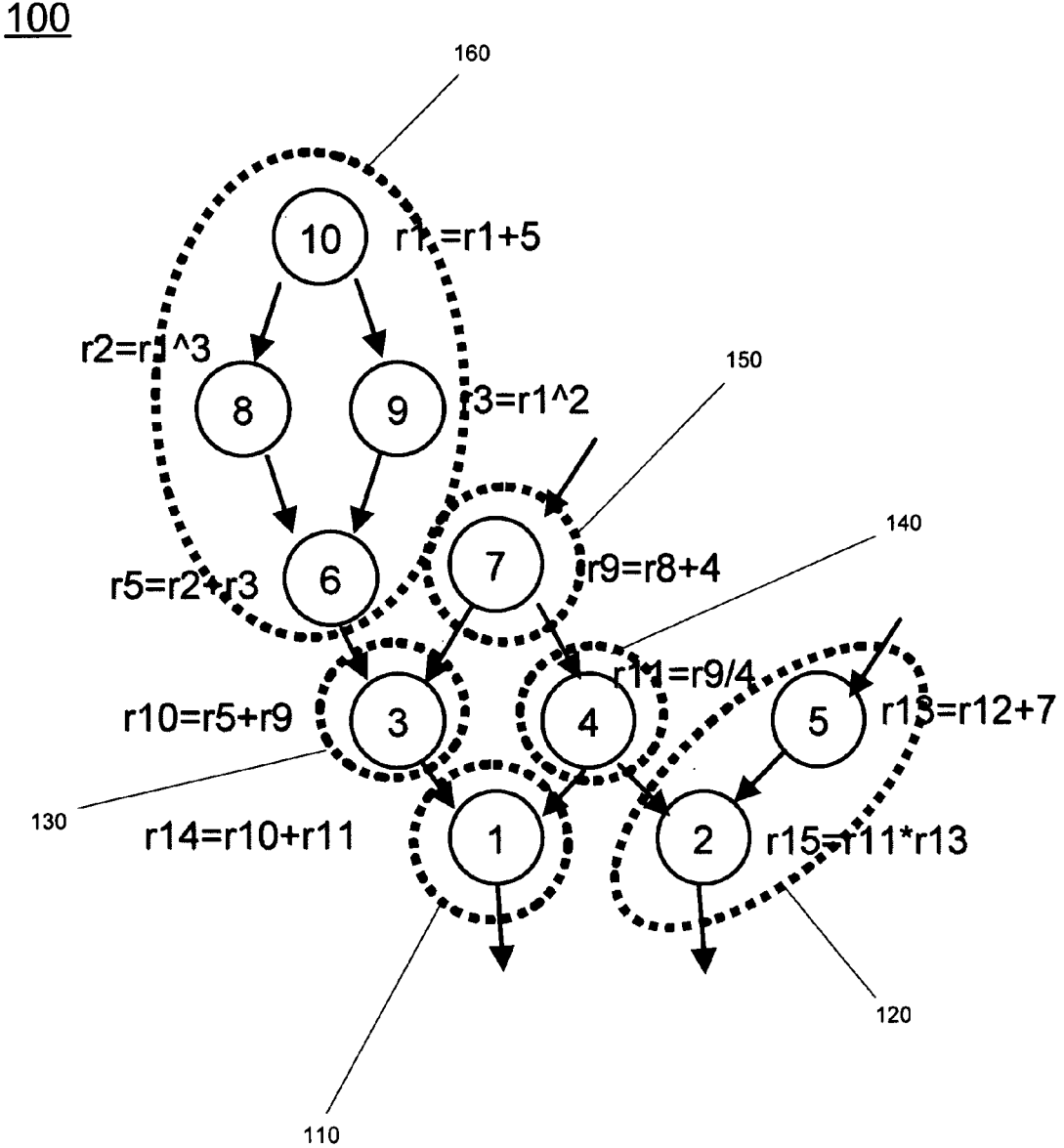
FIG. 2 is a grouping of nodes in accordance with one embodiment of the present invention.

As shown in FIG. 2, which is a grouping of nodes 100 into strands in accordance with an embodiment of the present invention, observing the constraints of 1 output and 2 inputs, strands 110-160 (i.e., strands {1}, {2, 5}, {3}, {4}, {6, 8, 9, 10}, {7}) are formed in order. Additional constraints may include a maximum of a single memory operation and single branch instruction per strand.

Note that some single-node strands {1}, {3}, {4}, and {7} cannot be grouped into a larger strand because it would generate more than one output, therefore, it violates the constraint. An optimization called node splitting helps solve this problem. When a larger strand is identified, i.e., a so-called potential strand, that cannot be formed because the number of outputs exceeds the limit, the node(s) that generates results for multiple consumers may be split. The basic idea of node splitting is to split nodes that can be beneficial, in other words, reducing the total number of strands and increasing the average strand size. The algorithm is formed in a way which can always improve the average strand size. Table 2 shows pseudocode of an algorithm of node splitting in accordance with one embodiment of the present invention.

TABLE 2

```
for each node with more than 1 out-going edges {
    if (isSplitBeneficial(node)) {
        split node;
        merge node into new strands;
        enlarge new strands to merge more strands;
    }
}
```

TABLE 2-continued

```
}
isSplitBeneficial (A) {
    for all possible splitting between out-going edges {
        assume A splits into A1 and A2;
        if ((A1 can merge with a strand which any A's
            out-going edge points to) && (A2 can merge
            with a strand which any A's out-going edge
            points to))
            return TRUE;
        else
            return FALSE;
    }
}
```

Figure 3:
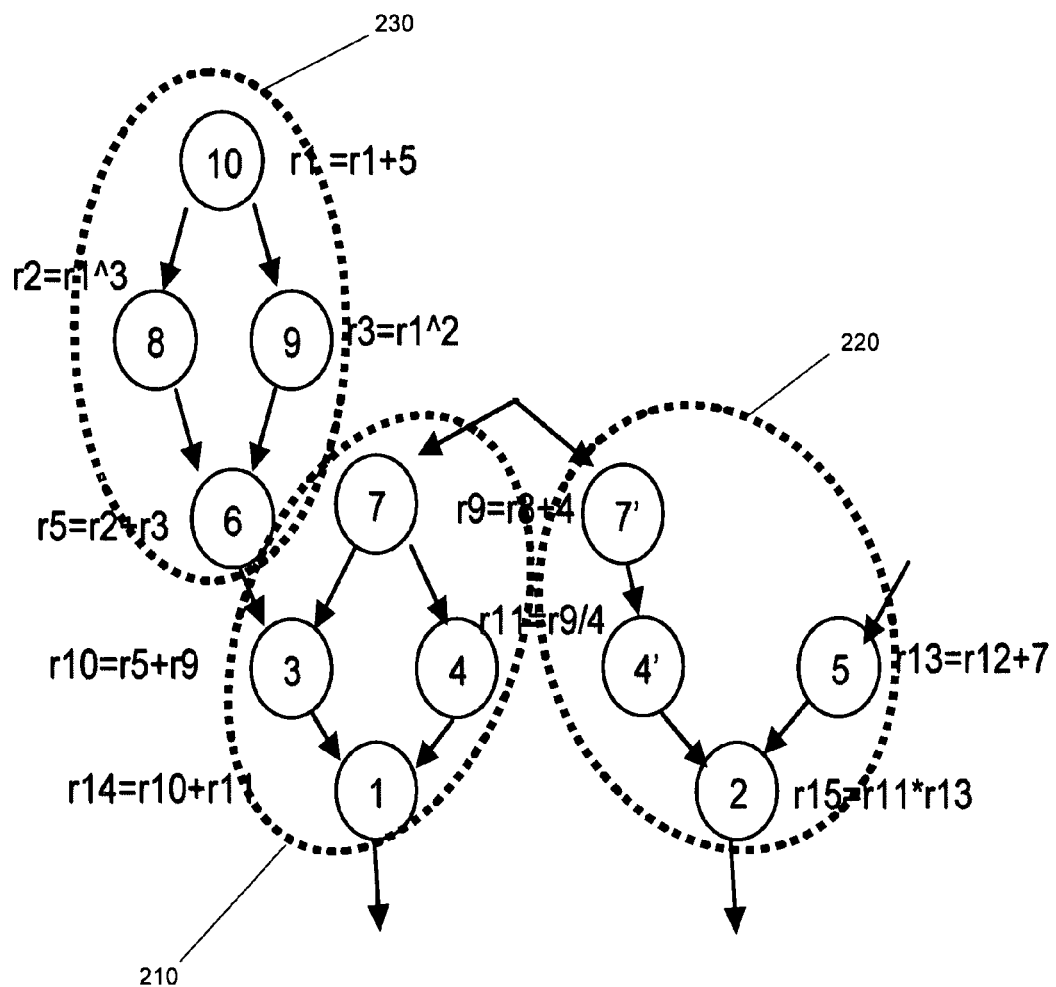
FIG. 3 is a grouping of nodes in accordance with another embodiment of the present invention.

As shown in FIG. 3, which includes strands 210-230, when nodes 4 and 7 are split into two duplicated nodes 4' and 7', two larger strands (210 and 220) are formed now, otherwise (as shown in FIG. 2) five small strands are needed.

Moreover, speculative optimizations can be adopted inside a strand. After converting branches inside a strand into assertions, speculative optimizations can be performed. In case of misspeculation, a non-strand version of recovery code is executed to guarantee correctness. After the software forms strands, it uses strand-aware register allocation and scheduling phases to further improve the code quality. During code generation, a so-called strand instruction is inserted into the instruction stream to represent strands. As one example, a 2-byte strand instruction takes four arguments, each which represents the number of instructions minus one belonging to one of the four strands following the strand instruction. For example, the instruction "strand 1, 3, 0, 1" means that instructions #1 and #2 after this instruction belong to a first strand, instructions #3, #4, #5 and #6 belong to a second strand, #7 by itself is a third strand, and #8 and #9 become a fourth strand. Thus the sum of the arguments relates to the number of instructions in a predetermined manner (i.e., the sum of the arguments (5) and the total number of arguments (4), corresponds to the number of instructions (9)).

Thus using embodiments of the present invention, strands are formed on dependence graphs and are reordered to maximize the potential performance gain and power savings, in contrast to performing linear scanning without reordering strands. Furthermore, embodiments do not require special hardware to track and form strands dynamically. In this way, the software (compiler or dynamic optimizer) can search for strands in superblocks, which exposes many opportunities to form larger strands. Moreover, a static compiler approach has no runtime or hardware overheads. Accordingly, embodiments leverage static and dynamic compiler technology to construct strands from large code regions for power efficient core design.

Figure 4:
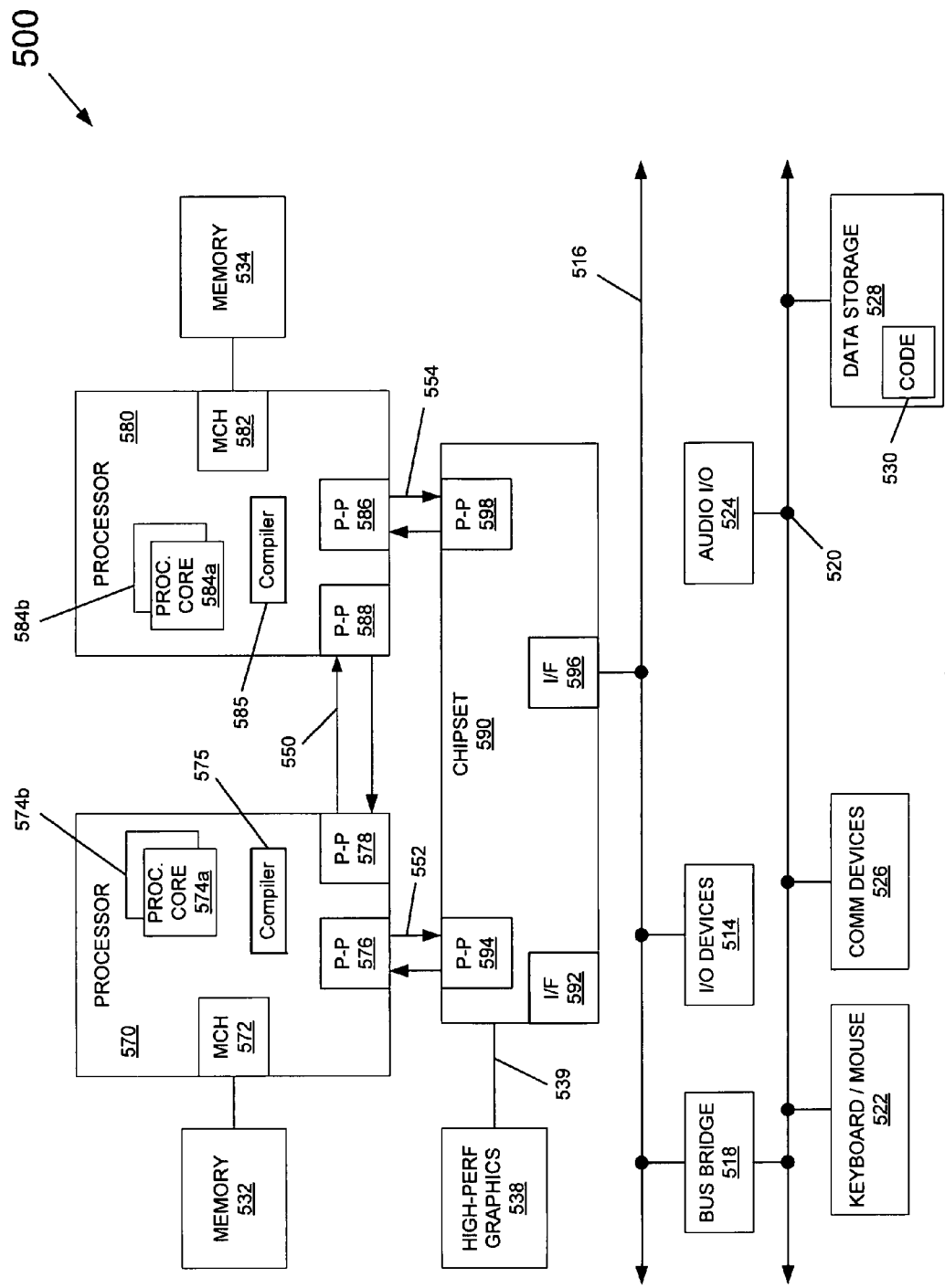
FIG. 4 is a block diagram of a multiprocessor system in accordance with an embodiment of the present invention.

Embodiments may be suited for many different types of platforms. Referring now to FIG. 4, shown is a block diagram of a multiprocessor system in accordance with an embodiment of the present invention. As shown in FIG. 4, multiprocessor system 500 is a point-to-point interconnect system, and includes a first processor 570 and a second processor 580 coupled via a point-to-point interconnect 550. However, in other embodiments the multiprocessor system may be of another bus architecture, such as a multi-drop bus or another such implementation. As shown in FIG. 4, each of processors 570 and 580 may be multi-core processors including first and second processor cores (i.e., processor cores 574a and 574b and processor cores 584a and 584b), although other cores and potentially many more other cores may be present in particular embodiments. Furthermore, as shown in FIG. 4 a compiler 575 and 585 may be present, respectively, and may generate strands in accordance with an embodiment of the present invention, optimized for a given multi-core or many-core architecture.

Still referring to FIG. 4, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 4, MCH's 572 and 582 couple the processors to respective memories, namely a memory 532 and a memory 534, which may be portions of main memory (e.g., a dynamic random access memory (DRAM)) locally attached to the respective processors.

First processor 570 and second processor 580 may be coupled to a chipset 590 via P-P interconnects 552 and 554, respectively. As shown in FIG. 4, chipset 590 includes P-P interfaces 594 and 598. Furthermore, chipset 590 includes an interface 592 to couple chipset 590 with a high performance graphics engine 538 via a bus 539.

As shown in FIG. 4, various I/O devices 514 may be coupled to first bus 516, along with a bus bridge 518 which couples first bus 516 to a second bus 520. In one embodiment, second bus 520 may be a low pin count (LPC) bus. Various devices may be coupled to second bus 520 including, for example, a keyboard/mouse 522, communication devices 526 and a data storage unit 528 which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one non-transitory storage medium having instructions stored thereon for causing a system to:
    obtain code of a superblock;
    build a directed acyclic graph (DAG);
    sort a plurality of nodes of the DAG into a topological order;
    form a plurality of strands from the plurality of nodes based on at least one of hardware constraints, rule constraints, and scheduling constraints, each of the strands including at least one node and the hardware constraints corresponding to micro-architectural features of a many-core processor;
    identify from the plurality of strands a potential strand, wherein the potential strand violates one of the rule constraints, and then duplicating at least one of the nodes;
    after the duplicating, form a first strand that includes the potential strand and a second strand that includes at least one of the duplicated nodes but not the potential strand; and
    generate executable code for the first and second strands and store the executable code in a storage.

2. The at least one medium of claim 1, comprising instructions to generate the executable code using a compiler or dynamic optimizer.

3. The at least one medium of claim 1 comprising instructions to optimize at least some of the plurality of strands, which comprises converting branches within the at least some strands into assertions and inserting a non-strand version of recovery code if a misspeculation occurs.

4. The at least one medium of claim 1, wherein the instructions to generate the executable code include instructions to insert a strand instruction having a plurality of arguments into an instruction stream, each of the plurality of arguments to identify a strand length of one or more instructions following the strand instruction, wherein a sum of the plurality of arguments is related to the number of the one or more following instructions.

5. The at least one medium of claim 1, comprising instructions to execute the plurality of strands on the many-core processor.

6. An article comprising a non-transitory machine-accessible medium including instructions that when executed cause a system to:
    obtain code of a superblock including a plurality of basic blocks in a compiler;
    build a dependency directed acyclic graph (DAG) for the code;
    sort a plurality of nodes coupled by edges of the dependency DAG into a topological order, each node representing an instruction and each edge representing a dependency between instructions;
    form a plurality of strands from the plurality of nodes based on at least one of hardware constraints of a multi-core processor of the system, rule constraints, and scheduling constraints, each of the strands including at least one node;
    identify from the plurality of strands a potential strand, wherein the potential strand violates one of the rule constraints, and duplicate at least one of the nodes after identifying the potential strand;
    form a first strand from the potential strand and form a second strand including at least one of the duplicated nodes but not the potential strand;
    optimize at least some of the plurality of strands by conversion of branches within the at least some strands into assertions and insert a non-strand version of recovery code if a misspeculation occurs; and
    generate executable code for each of the first and second strands and store the executable code in a storage of the system.

7. The at least one medium of claim 1, wherein each of the first and second strands have duplicated nodes.

8. The at least one medium of claim 1, comprising instructions to execute the first and second strands on the many-core processor.

9. The article of claim 6, further comprising instructions that when executed cause the system to execute the first and second strands on a many-core processor.

* * * * *